United States Patent Office 3,000,835
Patented Sept. 19, 1961

3,000,835
DEFOAMER COMPOSITION AND METHODS FOR USING SAME
Raymond L. Mayhew, Phillipsburg, and Norman F. Ottley, Metuchen, N.J., assignors to General Aniline & Film Corporation, New York, N.Y., a corporation of Delaware
No Drawing. Filed Jan. 8, 1957, Ser. No. 632,968
13 Claims. (Cl. 252—321)

This invention relates to new defoaming compositions and particularly to non-ionic defoamers which give outstanding foam inhibiting characteristics in aqueous systems.

In various fields of endeavor, and in many commercial processes, the problem of foaming or excessive foaming seriously hampers such processes, often creating an unsatisfactory economical situation with respect to the process or products involved. In addition, and certainly of equal importance, is the, in many instances, danger attendant with undesirable foam in the aforementioned processes and fields of endeavor. Because of these two major factors, it is often very desirable and usually necessary that some means be employed to allay the foam, destroy it or reduce it so as to render the material handled or the process involved safe to personnel and economically feasible. Among the numerous fields in which defoamers are particularly advantageous are those involved with the manufacture and compounding of natural and synthetic rubber latices, plastic latices, vat dyestuff preparations, various pharmaceutical preparations and in particular those manufactured by aerobic fermentation processes, paper pulp manufacture and use, glue solutions, compositions used in textile finishing operations such as water-proofing emulsions and the like, drilling muds, surfactants and detergents, cutting oils, paints, and the like.

It is therefore an object of this invention to provide new and useful compositions which are outstanding in their defoaming action.

It is a further object of this invention to provide new and useful compositions which are excellent defoamers in aqueous systems.

It is a still further object of this invention to provide processes for employing the defoamers of this invention and in particular for employing same in various aqueous systems which tend to foam excessively or undesirably.

Other objects will appear hereinafter as the description proceeds.

These and other objects of the present invention are obtained by providing a composition which is a physical admixture of a particular class of naturally occurring oils in combination with polyoxyalkylated derivatives of said oils.

The naturally occurring oils which are contemplated for use in this invention comprise those oils which contain at least 25% and preferably from 40 to 70% diethenoic fatty acids. The most common of this group of dienoic acids is linoleic acid (octadecadienoic). Other doubly-unsaturated fatty acids may also be employed such as hiragonic acid as well as $C_{14}$ acids which are known to occur naturally. Natural oils contain these acids as the glyceride esters but it is also possible to employ other synthetic doubly-unsaturated fatty acids either as the free acid or in the form of the glyceride esters thereof.

The following natural oils are suitable for use in the present invention: corn germ oil, corn oil, cottonseed oil, sunflower seed oil, poppyseed oil, sesameseed oil, linseed oil, perilla oil, and soybean oil. The average linoleic acid content of these materials is as follows:

| | Percent |
|---|---|
| Corn germ oil | 40 |
| Corn oil | 40 |
| Cottonseed oil | 51 |
| Sunflower seed oil | 57 |
| Poppyseed oil | 58 |
| Sesameseed oil | 35 |
| Linseed oil | 48 |
| Perilla oil | 41 |
| Soybean oil | 55 |

The polyoxyalkylated derivatives of the aforementioned products are prepared in the conventional manner as, for example described in U.S. Patents 1,970,578, 2,194,429, 2,213,477, 2,510,063, 2,564,757, and 2,564,759, by reaction with the usual oxyalkylating agent such as ethylene oxide, propylene oxide, glycidol and the like. The polyoxyalkylated derivatives which are contemplated for use in this invention are those condensation products containing from 6 to 20 moles of the above described oxyalkylating agents per mole of oil. The compositions of this invention comprise a mixture of the two above described types of products in the ratio of 1:4 to 4:1 by weight. Within this critical range the compositions exhibit outstanding and superior anti-foaming properties in aqueous processes. Thus, for example, such compositions are in all cases much more effective than either of the components of the composition alone. In all cases, the effectiveness is at least twice that which could have been expected from the defoaming action of the individual products of the composition. The following examples will serve to illustrate the compositions of this invention and their outstanding defoaming performance without being deemed limitative thereof; parts means parts by weight.

EXAMPLE 1

To a 50 g. sample of a latex containing 50% solids, the latter composed of a vinyl chloride-vinylidene chloride copolymer (90:10) contained in a 600 ml. beaker equipped with a high speed mixer there is added 1% based on the solids content of the latex of a composition of 1 part crude degummed soybean oil and 1 part of a condensation product of crude degummed soybean oil with 15 moles of ethylene oxide. The resultant mixture is then agitated at high speed and the time required for the foam to reach the top of the beaker is recorded. In this instance the time is 8.5 minutes. The same procedure carried out in the absence of the defoaming agent gives a time of 2.9 minutes. The crude degummed soybean oil in amounts from 0.5 to 1% gives a mean valve of 3.3 minutes. The polyoxyethylated product in amounts of 0.5 to 1% gives a mean time of 4 minutes. It would have obviously, then, been expected that a combination of the two ingredients would give a value of approximately 3.5 to 4 minutes. The value actually obtained indicates that the instant composition is approximately 100% more effective than the individual components thereof. These results are tabulated below in Table I.

Table I

| Percent Based on Latex Solids | | Time Required For Foam to Reach Top of Beaker (min.) |
|---|---|---|
| Crude Degummed Soybean Oil | Ethylene Oxide Condensate | |
| 0.5 | 0.0 | 3.5 |
| 1.0 | 0.0 | 3.2 |
| 0.5 | 0.5 | 8.5 |
| 0.0 | 0.5 | 3.4 |
| 0.0 | 1.0 | 4.5 |

EXAMPLE 2

The procedure of Example 1 is repeated employing varying ratios of the crude oil to the ethylene oxide condensate thereof. Table II below gives the results obtained with such compositions wherein the ratio of components varies from 4:1 to 1:4.

Table II

| A | B | Ratio A/B | Time Required For Foam to Reach Top of Beaker (min.) |
|---|---|---|---|
| Percent Crude Degummed Soybean Oil | Percent Ethylene Oxide Condensate | | |
| 0.8 | 0.2 | 4:1 | 6.6 |
| 0.7 | 0.3 | 7:3 | 6.8 |
| 0.6 | 0.4 | 3:2 | 7.0 |
| 0.55 | 0.45 | 11:9 | 7.5 |
| 0.45 | 0.55 | 9:11 | 9.5 |
| 0.4 | 0.6 | 2:3 | 12.0 |
| 0.33 | 0.67 | 1:2 | 9.7 |
| 0.25 | 0.75 | 1:3 | 10.0 |
| 0.2 | 0.8 | 1:4 | 10.0 |
| 0.2 | 0.0 | | 3.1 |
| 0.0 | 0.8 | | 3.2 |
| 0.4 | 0.0 | | 3.5 |
| 0.0 | 0.6 | | 3.5 |

In all instances it will be observed from the data in the above table that the compositions of the present invention are about 100% more effective than the individual components thereof, and in some cases as much as three to four times as effective. As compared to the control containing no defoaming material, the compositions above described reduce the undesirable foam to about one-third to one-fourth of that obtained in the absence of the defoaming composition.

EXAMPLE 3

A composition comprising 4 parts crude degummed soybean oil and 1 part of a condensation product of crude degummed soybean oil with 15 moles of ethylene oxide is employed to inhibit the foam produced during the aerobic fermentation in the manufacture of penicillin. When used in amounts of 1%, this composition gives outstanding and exceptionally effective inhibition of the foam normally produced during fermentation in the absence of such inhibitors.

EXAMPLE 4

The procedure of Example 1 is repeated employing a rubber latex base paint containing 40% of a styrene-butadiene copolymer (3 parts styrene to 1 part butadiene). The foam reduction as measured by the technique described in Example 1 is two-thirds of that obtained in the absence of the defoaming agent.

EXAMPLE 5

To a solution of 10 g. of animal glue dissolved in 50 cc. of water, there is added 0.1 g. of a mixture of equal parts of crude degummed soybean oil and a condensate of this oil with 15 moles of ethylene oxide. When tested in the manner described in Example 1, it is found that this treated glue solution takes three times as long for the foam to reach the top of the beaker as compared to a similar glue solution which does not contain any defoamer.

EXAMPLE 6

The procedure of Example 1 is again repeated employing varying ratios of soybean oil and ethylene condensation products of this oil wherein the latter contains 6 and 20 moles of ethylene oxide. The ratios of oil to oil condensate are varied from 4:1 to 1:4. The results obtained with these compositions are tabulated below in Table III.

Table III

| Percent Based on Latex Solids | | | Ratio A/B or A/C | Time Required for Foam to Reach Top of Beaker (min.) |
|---|---|---|---|---|
| A Crude Degummed Soybean Oil | B 6 Mole Et₂O Condensate | C 20 Mole Et₂O Condensate | | |
| 0.8 | 0.2 | | 4:1 | 7.1 |
| 0.8 | | 0.2 | 4:1 | 7.5 |
| 0.7 | 0.3 | | 7:3 | 8.1 |
| 0.7 | | 0.3 | 7:3 | 8.3 |
| 0.6 | 0.4 | | 3:2 | 8.0 |
| 0.6 | | 0.4 | 3:2 | 8.2 |
| 0.5 | 0.5 | | 1:1 | 9.2 |
| 0.5 | | 0.5 | 1:1 | 9.5 |
| 0.4 | 0.6 | | 2:3 | 11.3 |
| 0.4 | | 0.6 | 2:3 | 11.4 |
| 0.33 | 0.67 | | 1:2 | 11.0 |
| 0.33 | | 0.67 | 1:2 | 11.1 |
| 0.25 | 0.75 | | 1:3 | 10.9 |
| 0.25 | | 0.75 | 1:3 | 10.7 |
| 0.2 | 0.8 | | 1:4 | 11.2 |
| 0.2 | | 0.8 | 1:4 | 11.0 |
| | 0.2 | | | 3.1 |
| | 0.4 | | | 3.0 |
| | 0.6 | | | 3.2 |
| | 0.8 | | | 3.4 |
| | 1.0 | | | 3.4 |
| | | 0.2 | | 3.0 |
| | | 0.4 | | 3.3 |
| | | 0.6 | | 3.2 |
| | | 0.8 | | 3.4 |
| | | 1.0 | | 3.6 |

Again it will be observed that the mixtures within the ratios shown exhibit outstandingly superior and unexpected defoaming action.

EXAMPLE 7

The procedure of Example 6 is repeated except that the oil employed is cottonseed oil and the varying condensation products contain 6, 12 and 20 moles of ethylene oxide. The results appear below in Table IV.

Table IV

| Percent Based on Latex Solids | | | | Ratio of A/B, A/C or A/D | Time Required for Foam to Reach Top of Beaker (min.) |
|---|---|---|---|---|---|
| A Cottonseed Oil | B 6 Mole Et₂O Condensate | C 12 Mole Et₂O Condensate | D 20 Mole Et₂O Condensate | | |
| 0.8 | 0.2 | | | 4:1 | 6.7 |
| 0.8 | | 0.2 | | 4:1 | 6.9 |
| 0.8 | | | 0.2 | 4:1 | 7.1 |
| 0.7 | 0.3 | | | 7:3 | 7.9 |
| 0.7 | | 0.3 | | 7:3 | 8.1 |
| 0.7 | | | 0.3 | 7:3 | 8.1 |
| 0.6 | 0.4 | | | 3:2 | 7.8 |
| 0.6 | | 0.4 | | 3:2 | 7.9 |
| 0.6 | | | 0.4 | 3:2 | 8.0 |
| 0.5 | 0.5 | | | 1:1 | 9.4 |
| 0.5 | | 0.5 | | 1:1 | 9.8 |
| 0.5 | | | 0.5 | 1:1 | 9.7 |
| 0.4 | 0.6 | | | 2:3 | 10.7 |
| 0.4 | | 0.6 | | 2:3 | 10.8 |
| 0.4 | | | 0.6 | 2:3 | 10.5 |
| 0.33 | 0.67 | | | 1:2 | 9.9 |
| 0.33 | | 0.67 | | 1:2 | 10.1 |
| 0.33 | | | 0.67 | 1:2 | 10.3 |
| 0.25 | 0.75 | | | 1:3 | 10.4 |
| 0.25 | | 0.75 | | 1:3 | 10.4 |
| 0.25 | | | 0.75 | 1:3 | 10.1 |
| 0.2 | 0.8 | | | 1:4 | 9.8 |
| 0.2 | | 0.8 | | 1:4 | 10.4 |
| 0.2 | | | 0.8 | 1:4 | 10.6 |
| 0.2 | | | | | 2.9 |
| 0.5 | | | | | 2.8 |
| 1.0 | | | | | 3.1 |
| | 0.2 | | | | 3.1 |
| | 0.5 | | | | 3.3 |
| | 1.0 | | | | 3.8 |

From the above data it will be apparent that the mixtures encompassed by this invention are about 2 to 4 times as effective as the individual components in foam inhibition.

EXAMPLE 8

The procedure of Example 7 is repeated employing linseed oil in lieu of cottonseed oil. The results are comparable therewith.

In the foregoing examples it will be evident that this invention provides outstanding defoaming agents which are extremely effective when used in very small quantities. The amount of defoaming agent to be employed will of course vary depending upon the specific nature of the aqueous system to be treated and with the amount of inhibiting action desired. Therefore, the exact amount to be employed in any given situation cannot be specifically set forth but in general from 0.5% to 2% will produce effective defoaming action in the majority of such systems. The following table shows the results of repeating Example 1 except that the defoamer composition is employed in amounts of 0.5% and 2% based on the solids content of the latex.

*Table V*

| Percent Based on Latex Solids | | Time Required for Foam to Reach Top of Beaker (min.) |
|---|---|---|
| Crude Degummed Soybean Oil | Ethylene Oxide Condensate | |
| 0.4 | 0.1 | 6.3 |
| 0.3 | 0.2 | 6.5 |
| 0.25 | 0.25 | 7.5 |
| 0.2 | 0.3 | 9.8 |
| 0.1 | 0.4 | 9.6 |
| 0.1 | 0.0 | 3.2 |
| 0.2 | 0.0 | 3.2 |
| 0.3 | 0.0 | 3.3 |
| 0.4 | 0.0 | 3.5 |
| 0.0 | 0.1 | 3.0 |
| 0.0 | 0.2 | 3.0 |
| 0.0 | 0.3 | 3.2 |
| 0.0 | 0.4 | 3.4 |

We claim:

1. A defoaming agent consisting essentially of a mixture of a fatty oil containing at least 25% doubly unsaturated fatty acids and a polyoxyalkylated derivative thereof containing from 6 to 20 moles of oxyalkylating agent per mole of fatty oil, the ratio of the oil to the polyoxyalkylated derivative thereof being within the range of from 4:1 to 1:4.

2. An anti-foaming agent consisting essentially of a mixture of a fatty oil containing from 40 to 70% doubly unsaturated fatty acids and a polyoxyethylated derivative thereof containing from 6 to 20 moles of ethylene oxide per mole of fatty oil, the ratio of fatty oil to the ethylene oxide derivative being from 4:1 to 1:4.

3. An anti-foaming agent for defoaming aqueous systems consisting essentially of a mixture of soybean oil and an ethylene oxide condensation product thereof containing 15 moles of ethylene oxide per mole of soybean oil, the soybean oil and the condensation product being present in the range of from 4:1 to 1:4 by weight.

4. An anti-foaming agent consisting essentially of 4 parts by weight of crude degummed soybean oil and 1 part by weight of an ethylene oxide condensation product thereof containing 15 moles of ethylene oxide per mole of soybean oil.

5. An anti-foaming agent consisting essentially of 1 part by weight of crude degummed soybean oil and 1 part by weight of an ethylene oxide condensation product thereof containing 15 moles of ethylene oxide per mole of soybean oil.

6. An anti-foaming agent consisting essentially of 1 part by weight of crude degummed soybean oil and 0.67 part by weight of an ethylene oxide condensation product thereof containing 15 moles of ethylene oxide per mole of soybean oil.

7. An anti-foaming agent consisting essentially of 1 part by weight of crude degummed soybean oil and 4 parts by weight of an ethylene oxide condensation product thereof containing 15 moles of ethylene oxide per mole of soybean oil.

8. A method for reducing undesirable foam in aqueous systems which comprises adding from about 0.5% to about 2% of a composition as defined in claim 1 to such systems.

9. A method for reducing foam in aqueous emulsion systems comprising adding from about 0.5% to about 2% of a defoaming agent as defined in claim 1 to such emulsion systems.

10. A method for reducing foam in aqueous synthetic latex systems which comprises adding thereto from about 0.5% to about 2%, sufficient to reduce the foam of said system, of a composition as defined in claim 3.

11. A method for reducing foam in aqueous synthetic rubber latex systems which comprises adding thereto about 1% of a composition as defined in claim 4.

12. A method for reducing foam in aqueous glue solutions which comprises adding thereto about 1% of a composition as defined in claim 4.

13. A method for reducing foam in aerobic fermenting systems which comprises adding thereto about 1% of a composition as defined in claim 4.

References Cited in the file of this patent

UNITED STATES PATENTS

| 2,666,017 | Moss et al. | Jan. 12, 1954 |
| 2,753,309 | Figdor | July 3, 1956 |
| 2,762,780 | Kulakow | Sept. 11, 1956 |

FOREIGN PATENTS

| 443,631 | Great Britain | Feb. 17, 1936 |